United States Patent
Vogelsang

(10) Patent No.: US 11,377,368 B2
(45) Date of Patent: Jul. 5, 2022

(54) APPARATUS FOR PRODUCING AND PROVIDING STERILE WATER AND METHOD OF OPERATING THE APPARATUS

(71) Applicant: Krones AG, Neutraubling (DE)

(72) Inventor: Christian Vogelsang, Kelheim (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 17/108,709

(22) Filed: Dec. 1, 2020

(65) Prior Publication Data
US 2021/0171364 A1   Jun. 10, 2021

(30) Foreign Application Priority Data
Dec. 5, 2019   (DE) ...................... 10 2019 133 122.6

(51) Int. Cl.
C02F 1/02   (2006.01)
B01D 1/02   (2006.01)

(52) U.S. Cl.
CPC ............... C02F 1/02 (2013.01); B01D 1/02 (2013.01); *C02F 2209/02* (2013.01); *C02F 2303/04* (2013.01)

(58) Field of Classification Search
CPC . C02F 1/02; B01D 1/02; A61L 2/0023; B01L 7/00
USPC ................ 210/742; 203/10, 11; 422/3, 307
See application file for complete search history.

(56) References Cited

U.S. PATENT DOCUMENTS 5,916,437 A *   6/1999   Levitin ............... C05F 7/00
                                                        210/177
8,206,558 B2 *  6/2012   Fickenscher ........ B01D 5/006
                                                        202/182
9,802,845 B2 * 10/2017   Thiers ................ B01D 1/0011
(Continued)

FOREIGN PATENT DOCUMENTS

AU   768250         12/2003
CN   106587222 A *   4/2017   ............... C02F 1/02
EP   1106083         6/2001
(Continued)

OTHER PUBLICATIONS

English Translation WO-2018113091-A1 (Year: 2018).*
European Search Report for Application No. 20196186.9 dated Mar. 12, 2021, 8 pages.

*Primary Examiner* — Nina Bhat
(74) *Attorney, Agent, or Firm* — Lowenstein Sandler LLP

(57) ABSTRACT

A method and an apparatus for producing and providing sterile water comprising an inlet for process water; a recuperator for preheating process water and for cooling down the sterile water; a heating circuit comprising a pump, a heater for heating preheated process water and a heat retention section for keeping heated process water hot; a temperature sensor for measuring a current temperature of the sterile water leaving the heat retention section; a flow control valve located downstream of the temperature sensor; and a bypass between the flow control valve and the heater. The flow control valve keeps a volume flow in the heating circuit constant, the recuperator cools down the sterile water of a first partial volume flow, when such a first partial volume flow of sterile water is taken from the heating circuit, the bypass returns into the heating circuit a second partial volume flow of sterile water.

14 Claims, 2 Drawing Sheets

(56) References Cited

U.S. PATENT DOCUMENTS

2004/0109788 A1\* 6/2004 Li .................... C02F 1/006
422/3
2006/0226081 A1\* 10/2006 Lupton ............ B01D 61/025
210/652

FOREIGN PATENT DOCUMENTS

| IN | 313155 B | \* | 5/2019 | ............ A23C 3/33 |
| WO | 93/005667 | | 4/1993 | |
| WO | WO-2018113091 A1 | \* | 6/2018 | ............ C02F 1/02 |

\* cited by examiner

APPARATUS FOR PRODUCING AND PROVIDING STERILE WATER AND METHOD OF OPERATING THE APPARATUS

RELATED APPLICATIONS

This application claims the benefit under 35 U.S.C. § 119(a) of German Patent Application 10 2019 133 122.6, filed Dec. 5, 2019, which is incorporated by reference herein.

TECHNICAL FIELD

The present disclosure relates to an apparatus for producing and providing sterile water and to a method of operating the apparatus.

BACKGROUND

For operating plants that fulfil the demand of being aseptic, sterile water may be required. This sterile water is used for cleaning plant components, for cleaning packaging materials, for maintaining a wet condition or for cooling. Examples in the case of an aseptic filling machine are internal cleaning of a filling machine during a grade change, thread cleansing after the filling process, lubrication of components or containers in the bottle run and cooling of the filling product tank after sterilization.

The sterile water is produced by a sterile water ultra-high temperature treatment (UHT), where the initially non-sterile water is heated and kept constantly hot for a defined period of time. The water thus undergoes pasteurization, which will define the water as sterile water when a minimum temperature and heat retention time are adhered.

The water in a circuit is pasteurized with a nominal volume flow and then cooled down to a normal or operating temperature via a recuperation and cooling stage. From here the water can be branched off to the consumers. If less water than the nominal volume flow is taken from the system, the respective water will be returned to the circulation system and reheated.

This process entails energy losses, which occur in stand-by or partial-load operation. The energy losses result from the recuperation efficiency, which is about 90% in technical practice. On the one hand, this loss must be compensated for via the energy input into the still unsterile water after its recuperation. On the other hand, the recuperated sterile water must be additionally cooled to the same extent. This means that all the water that is not used will be heated continuously to the extent of the recuperation loss and then cooled down again to the same extent. This is a technically avoidable loss of energy.

U.S. Pat. No. 4,416,194 discloses a preparation system for soft drink beverages. A beverage is conducted through a line to and through a heat recovery generator and, in the course of this process, it takes up heat from a countercurrently conducted beverage that has already been pasteurized. The preheated beverage is conducted to and through a main beverage heater and, in the course of this process, it takes up heat from a countercurrently conducted hot liquid, and is conducted through a heat retention section so as to be pasteurized. The pasteurized beverage is then passed on to the heat recovery generator and from there into a cooling and carbonating apparatus. At the end of the heat retention section a first temperature sensor is provided to check whether the temperature of the beverage is high enough. If this is not the case, the product is conducted back to the main beverage heater by a diversion valve. In addition, a second temperature sensor is provided at the end of the heat retention section, so as to check whether the temperature of the beverage is too high. If this is the case, cold liquid can be added to the hot liquid, so that the product will not be excessively heated during further circulations.

DE 693 11 389 T2 discloses a method and an apparatus for heat treating a fluid product. The apparatus comprises a supply tank, which is connected via primary ducts of a regenerator, in succession, to a pump, a pasteurizer, a temperature maintaining element and a multi-way valve, which are connected in series by pipes. The multi-way valve is connected, at a first position, to a secondary duct of the regenerator located upstream of the pasteurizer and, at a second position, to a pump inlet. In addition, a product supply pump, which is located immediately downstream of the supply tank, is provided. Furthermore, the apparatus includes, both at the first and second positions of the multi-way valve, means for maintaining a positive pressure difference between the secondary and primary ducts of the regenerator.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
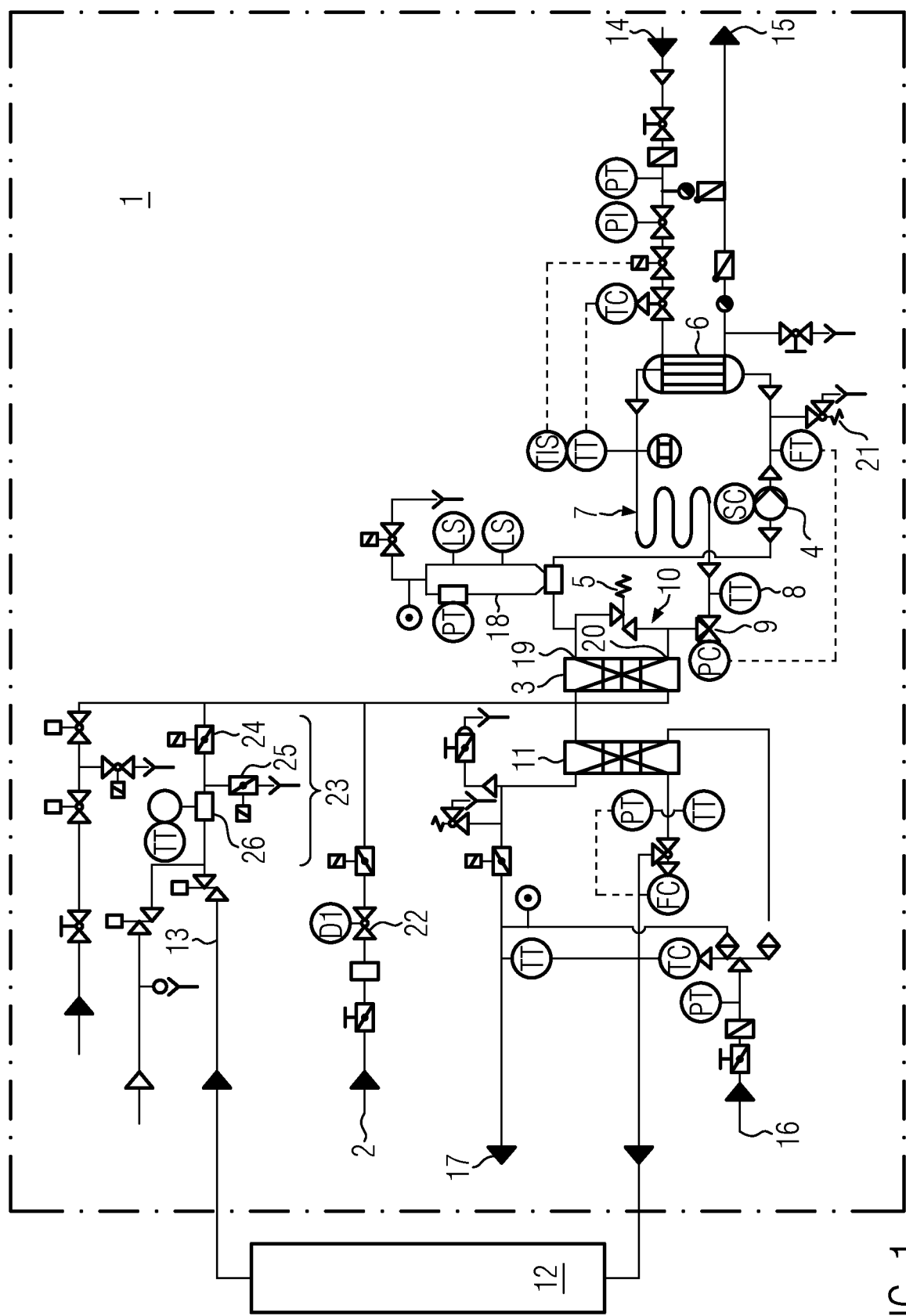
FIG. 1 shows a schematic view of an apparatus for producing sterile water, according to embodiments of the present disclosure.

The present disclosure provides an apparatus for producing and providing sterile water and a method of operating the apparatus, which allow sterile water to be produced and provided in an energy-efficient and reliable manner.

The apparatus for producing and providing sterile water according to the present disclosure comprises an inlet for process water, a recuperator located downstream of the inlet and used for preheating process water by sterile water flowing in countercurrent and for cooling down the sterile water by the process water flowing in countercurrent, and a heating circuit located downstream of the recuperator and comprising a pump, a heater for heating preheated process water and a heat retention section for keeping heated process water hot at a predetermined temperature for a predetermined period of time, so as to produce sterile water. The apparatus further comprises a temperature sensor located downstream of the heat retention section and used for measuring a current temperature of the sterile water leaving the heat retention section, and a flow control valve located downstream of the temperature sensor, a bypass provided between the flow control valve and the heater. The flow control valve is configured for keeping a volume flow in the heating circuit constant, the recuperator being configured for cooling down the sterile water of a first partial volume flow, when such a first partial volume flow of sterile water is taken from the heating circuit, the bypass being configured for returning into the heating circuit a second partial volume flow of sterile water, which corresponds to a difference between the volume flow and the first partial volume flow.

The process water may be non-sterile water. The process water may also include an amount of sterile water. The process water can be converted into sterile water by sterilization. Process water can be fed into the apparatus in quantities corresponding to the quantities of sterile water consumed. For example, the process water may be fed with a temperature between 10° Celsius (C) and 35° C. and a volume flow of up to 15 meters$^3$/hour (m$^3$/h).

The heating circuit can be operated with a volume flow, also referred to as nominal volume flow. The volume flow in the heating circuit may be 7.5 m$^3$/h to 15 m$^3$/h.

Process water can be fed into the heating circuit to the same extent to which sterile water is taken from the heating circuit, e.g. by one or a plurality of consumers.

The heat retention section may have a length of 25 meters (m), and a pressure in the heat retention section may be 5 bar at a maximum process water temperature of 156° C. The predetermined period of time may be 2 minutes.

Downstream of the flow control valve, a prevailing pressure may be 3.5 bar if sterile water is drawn off and 4.0 bar if no sterile water is drawn off, and the sterile water may have a temperature of 135° C. The Kv value of the flow control valve may be 12 if sterile water is drawn off and 7.5 if no sterile water is drawn off.

When sterile water has left the recuperator, e.g. with the first partial volume flow, it may have a temperature of 40° C.

It is not necessary to provide a buffer tank for the sterile water in the apparatus.

Due to the fact that the bypass is provided and that the heating circuit has no recuperation or cooling stage, only the sterile water of a first partial volume flow will be recuperated if such a first partial volume flow is drawn off and the remaining sterile water, i.e. the sterile water in the second partial volume flow, will be returned into the heating circuit via the bypass. Therefore, unnecessary cooling of the sterile water of the second partial volume flow will be avoided.

In addition, the apparatus may comprise a cooler located downstream of the recuperator and used for cooling sterile water that is drawn off e.g. by one or by a plurality of consumers. Further cooling of the sterile water by the cooler may be necessary for cooling a filler tank in the production of carbonated products. The pressure prevailing downstream of the cooler may be a pressure of 3.5 bar.

Furthermore, the apparatus may comprise one or a plurality of consumers for consuming cooled down sterile water. The sterile water may have been cooled down by the recuperator or by the recuperator and the cooler. Sterile water may also only be provided to the consumer or the consumers, e.g. without the one or the plurality of consumers being part of the apparatus.

The sterile water may be used, for example, for cleansing threads of height-adjustable guidance handling parts, as e.g. disclosed in EP 2 700 613 A1, for rinsing filler tanks, e.g. during a product change and/or after a hot CIP, for rinsing and cooling warm/hot plant parts, e.g. of a filling plant and/or a pasteurization plant, for cleansing fillers of a beverage bottling plant and/or for filling surge tanks in aseptics. Other uses of sterile water are possible.

Furthermore, the apparatus may comprise a line located downstream of the one or the plurality of consumers and adapted to be opened for line sanitization.

This line may have provided therein a terminal vapor barrier. Up to the pressure holding valve, the pressure may be 3.5 bar.

Downstream of the pump and upstream of the heater, an overflow valve may be provided. A pressure downstream of the overflow valve may be 3 bar at a maximum process water temperature of 140° C. The sterility limit can be monitored by a pressure difference across the overflow valve. The pressure difference may be 0.5 bar.

The bypass may have provided therein a pressure holding valve. A pressure difference of 0.5 bar may be provided across the pressure holding valve of the bypass.

In addition, the heating circuit may comprise a degassing and expansion vessel. The pressure inside the degassing and expansion vessel may be a pressure of 3 bar.

A method of operating an apparatus as described hereinbefore or hereinafter comprises the following steps: feeding process water to the apparatus through an inlet of the apparatus; preheating the process water in a recuperator of the apparatus by sterile water flowing in countercurrent; heating the preheated process water in a heater of the apparatus; keeping the heated process water hot in a heat retention section of the apparatus at a predetermined temperature for a predetermined period of time, so as to produce sterile water; controlling a constant volume flow in a heating circuit of the apparatus by a flow control valve of the apparatus, so as to keep a heat holding time in the heating circuit constant; cooling down for the first time a first partial volume flow of sterile water, which is taken from the heating circuit, in the recuperator; and returning a second partial volume flow of sterile water, which corresponds to a difference between the volume flow and the first partial volume flow, into the heating circuit via a bypass of the apparatus.

The method may additionally include cooling down the sterile water a second time in a cooler of the apparatus.

The method may additionally include the cooled down sterile water to one or a plurality of consumers. The cooled down sterile water may have been cooled down by the first cooling step or by the first and the second cooling step.

A pressure difference of 0.5 bar may be provided across the pressure holding valve.

Downstream of the flow control valve, a pressure of 3.5 bar may be provided if sterile water is drawn off, or a pressure of 4.0 bar if no sterile water is drawn off.

FIG. 1 shows a schematic view of an apparatus 1 for producing sterile water, the elements of this apparatus 1 being shown in the dotdashed area in FIG. 1. The consumer 12 need not be included in the apparatus 1, but optionally the consumer 12 may also be included in the apparatus 1. Through a first inlet 2, process water can be fed into a line, which includes a pressure reducer 22 and through which the process water can be conducted to and through a recuperator 3. For example, the process water can be fed with a temperature between 10° C. and 35° C. and a volume flow of up to 15 m$^3$/h. In the recuperator 3, the process water can be preheated by hot sterile water flowing in countercurrent. From the recuperator 3, the preheated process water can be pumped by a pump 4 through a heating circuit, so as to be sterilized there. A nominal volume flow in the heating circuit may be 7.5 m$^3$/h to 15 m$^3$/h.

The preheated process water can be conducted past a degassing and expansion vessel 18 and/or through the degassing and expansion vessel 18 to and through the pump 4 and to and through a heater 6. The pressure prevailing in the degassing and expansion vessel 18 may be a pressure of 3 bar. An overflow valve 21 may be provided downstream of the pump 4 and upstream of the heater 6. The pressure downstream of the overflow valve 21 may be 3 bar at a maximum process water temperature of 140° C. The sterility limit can be monitored by a pressure difference across the overflow valve 21. The pressure difference may be 0.5 bar.

In the heater 6 the preheated process water may be heated in countercurrent to steam. Downstream of the heater 6, the heated process water may be conducted to and through a heat retention section 7, in which the heated process water can be kept at a predetermined temperature for a predetermined period of time, so as to be finally sterilized. The heat retention section 7 may have a length of 25 m, and a pressure in the heat retention section 7 may be 5 bar at a maximum process water temperature of 156° C. The predetermined period of time may be 2 minutes.

Downstream of the heat retention section 7, a temperature sensor 8 is arranged for measuring the current temperature of the sterile water downstream of the heat retention section 7.

Optionally, it can be determined whether the current temperature fulfills a requirement, e.g. whether the current temperature corresponds to a predetermined temperature and/or lies within a predetermined temperature range. If this is the case, it can be assumed that sterile water has been produced in the heating circuit.

If sterile water is required, e.g. by one or a plurality of consumers, a required partial volume flow can be drawn off from a sterile water system located downstream of the flow control valve 9. In so doing, the sterile water is conducted through a first inlet 20 through the recuperator 3, where it is cooled down. If no sterile water is required, the sterile water will be conducted via a bypass 10 through the pressure holding valve 5 back to and through the heater 6.

Downstream of the flow control valve 9, a prevailing pressure may be 3.5 bar if sterile water is drawn off and 4.0 bar if no sterile water is drawn off, and the sterile water may have a temperature of 135° C. The Kv value of the flow control valve 9 may be 12 if sterile water is drawn off and 7.5 if no sterile water is drawn off.

When the sterile water has left the recuperator 3, it may have a temperature of 40° C. and be conducted to and through a cooler 11, where the sterile water can be cooled down still further by ice water flowing in countercurrent or by some other kind of cooling water, e.g. cooling tower water. Cooling of the sterile water by the cooler 11 may be necessary for cooling a filler tank in the production of carbonated products. Optionally, the sterile water may also pass through the cooler 11 without being cooled. The pressure prevailing downstream of the cooler 11 may be a pressure of 3.5 bar and the sterile water may be fed to one or a plurality of consumers 12 for use.

Sterile water that is not required, e.g. sterile water which is not supplied to any consumer by way of example, can be conducted back via the bypass 10, through the pressure holding valve 5 and through the heater 6. To the same extent to which sterile water is consumed by the consumers 12, process water can be fed into the heating circuit, so as to produce and provide new sterile water.

Downstream of a line 13 following the one or the plurality of consumers 12, a vapor barrier 23 is provided, which comprises a valve 24, a gully valve 25 and a poppet valve 26.

The steam for the heater 6 can be fed through a second inlet 14, for example at 9 bar, and conducted to and through the heater 6. In the heater 6, the steam can give off heat to the preheated process water in countercurrent. Via a first outlet 15 the condensed steam can be discharged as condensate, for example at less than 2 bar.

The ice water or other kind of cooling water, e.g. cooling tower water, for the cooler 11 can be fed through a third inlet 16 and conducted to and through the cooler 11. For example, the ice water or other kind of cooling water, e.g. cooling tower water, may have a temperature of less than 5° C. and a rate of 25 m³/h. In the cooler 11, the ice water or other kind of cooling water, e.g. cooling tower water, can take up heat from the heated sterile water in countercurrent. The ice water or other kind of cooling water, e.g. cooling tower water, heated in the cooler 11 can be discharged via a second outlet 17.

Figure 2:
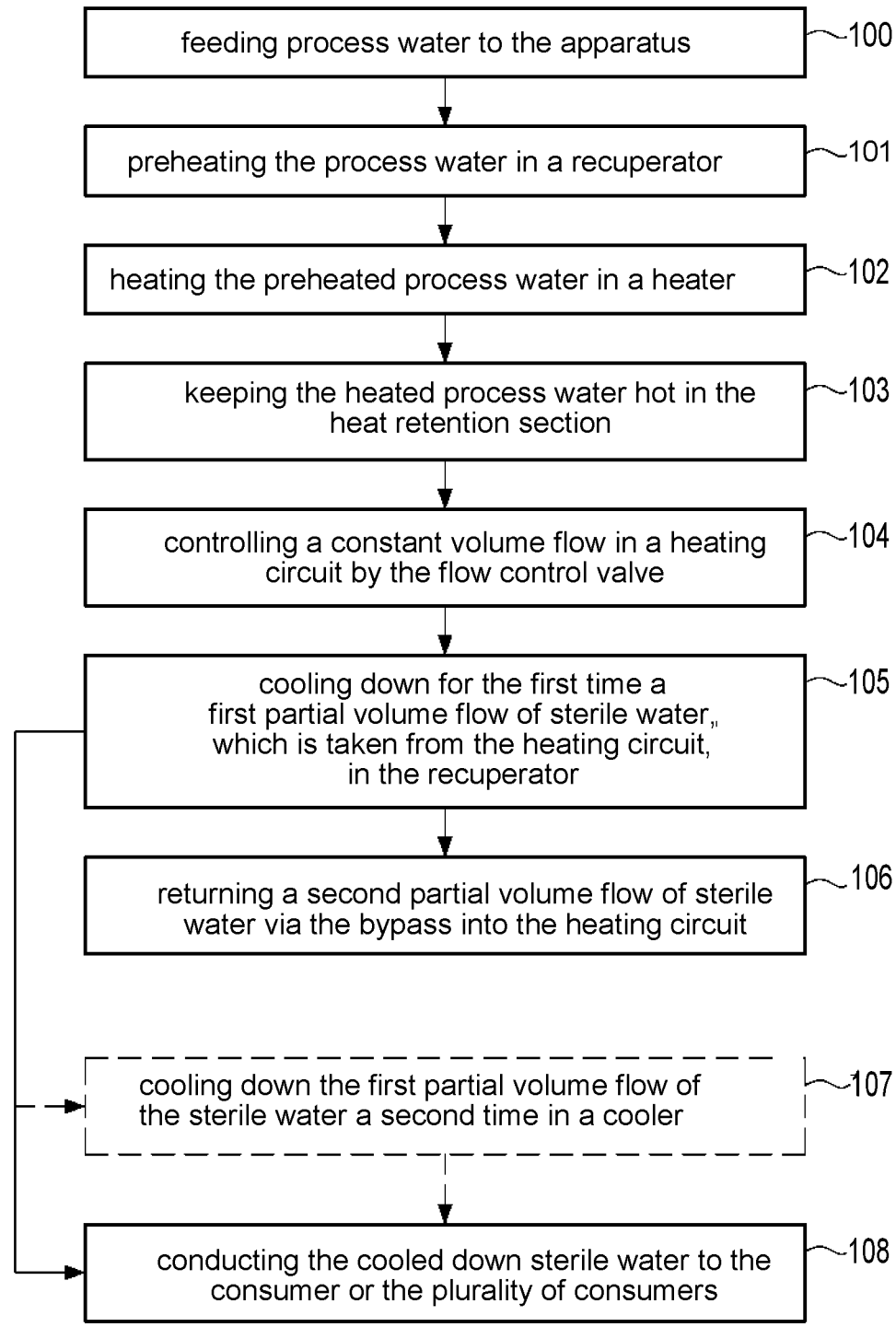
FIG. 2 shows a flow diagram of a method of operating the apparatus for producing and providing sterile water, according to embodiments of the present disclosure.

FIG. 2 shows a flow chart of a method of operating the apparatus for producing sterile water, according to embodiments of the present disclosure.

In step 100, process water is fed to the apparatus.

Subsequently, in step 101, the process water is preheated in the recuperator.

Then, in step 102, the preheated process water is heated in the heater.

Afterwards, in step 103, the heated process water is kept hot in the heat retention section at a predetermined temperature for a predetermined period of time. In this way, the sterile water can be produced.

In step 104, a constant volume flow in a heating circuit of the apparatus is controlled by a flow control valve of the apparatus, so as to keep a heat holding time in the heating circuit constant. The control of the constant volume flow in the heating circuit may be take place during the entire process for operating the apparatus for producing sterile water.

In step 105, a first partial volume flow of sterile water, which is taken from the heating circuit, is cooled down for the first time in the recuperator. This step 105 can take place after sterile water has been produced and when, for example, the first partial volume flow is taken from the heating circuit by one consumer or by a plurality of consumers.

In step 106, a second partial volume flow of sterile water, which corresponds to a difference between the volume flow and the first partial volume flow, is returned into the heating circuit via a bypass of the apparatus.

Optionally, in step 107, a second cooling down of the first partial volume flow of sterile water may take place in the cooler after the first cooling down. Subsequent to the first cooling down or subsequent to the first and second cooling down, the cooled down sterile water is conducted to the one or the plurality of consumers in step 108.

It is to be understood that the above description is intended to be illustrative, and not restrictive. Other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. An apparatus for producing and providing sterile water, comprising:
   an inlet to introduce process water, wherein the inlet is fluidly connected to a recuperator;
   the recuperator located downstream of the inlet, wherein the recuperator is to preheat the process water by sterile water flowing in countercurrent and to provide preheated process water to a heating circuit, and wherein the recuperator is to cool down the sterile water by the process water flowing in countercurrent; and
   the heating circuit located downstream of the recuperator comprising a pump, downstream of the pump a heater to heat the preheated process water and to provide heated process water to a heat retention section, and downstream of the heater the heat retention section to keep the heated process water hot at a predetermined temperature for a predetermined period of time, so as to produce sterile water, wherein the heating circuit comprises:
  a temperature sensor located downstream of the heat retention section, wherein the temperature sensor is to measure a current temperature of the sterile water leaving the heat retention section;
  a flow control valve located downstream of the temperature sensor; and
  a bypass provided between the flow control valve and the heater, wherein the bypass is a conduit; and
wherein the flow control valve is configured to keep a volume flow in the heating circuit constant, wherein the recuperator is configured to cool down the sterile water of a first partial volume flow when the first partial volume flow of sterile water is taken from the heating circuit, and wherein the bypass is configured to return into the heating circuit a second partial volume flow of sterile water, wherein the second partial volume flow corresponds to a difference between the volume flow and the first partial volume flow.

2. The apparatus of claim 1, further comprising a cooler located downstream of the recuperator, wherein the cooler is to further cool down the sterile water.

3. The apparatus of claim 1, further comprising one or a plurality of consumers for consuming cooled down sterile water.

4. The apparatus of claim 3, further comprising a line located downstream of the one or the plurality of consumers, wherein the line is openable for line sanitization by passing the cooled down sterile water through the opened line.

5. The apparatus of claim 4, wherein the line comprises a terminal vapor barrier.

6. The apparatus of claim 1, wherein an overflow valve is located downstream of the pump and upstream of the heater.

7. The apparatus of claim 1, wherein a pressure holding valve is provided within the bypass.

8. The apparatus of claim 1, wherein the heating circuit further comprises a degassing and expansion vessel.

9. A method of operating an apparatus for producing and providing sterile water, comprising:
  feeding process water to the apparatus through an inlet of the apparatus;
  preheating the process water in a recuperator of the apparatus by sterile water flowing in countercurrent;
  heating the preheated process water in a heater of the apparatus;
  maintaining the heated process water in a heat retention section of the apparatus at a predetermined temperature for a predetermined period of time;
  controlling a constant volume flow in a heating circuit of the apparatus by a flow control valve of the apparatus to maintain a constant heat holding time in the heating circuit;
  cooling down a first partial volume flow of sterile water, which is taken from the heating circuit in the recuperator; and
  returning a second partial volume flow of sterile water into the heating circuit via a bypass of the apparatus, wherein the second partial volume flow of sterile water corresponds to a difference between the volume flow and the first partial volume flow.

10. The method of claim 9, further comprising
cooling down the sterile water in a cooler of the apparatus.

11. The method of claim 9, further comprising
conducting the cooled down sterile water to one or a plurality of consumers.

12. The method of claim 9, wherein a pressure difference of 0.5 bar is provided across a pressure holding valve.

13. The method of claim 9, wherein downstream of the flow control valve, providing one of:
  responsive to determining that sterile water is drawn off, a pressure of 3.5 bar; or
  responsive to determining that sterile water is not drawn off, a pressure of 4.0 bar.

14. The method of claim 9, further comprising measuring a current temperature of the sterile water leaving the heat retention section.

* * * * *